United States Patent Office 3,494,806
Patented Feb. 10, 1970

3,494,806
METHOD OF PROVIDING A CORROSION RESISTANT COATING ON METAL AND THE COATED ARTICLE
Fred N. Teumac, Charlotte, N.C., assignor to The Dow Chemical Company, Midland, Mich., a corporation of Delaware
No Drawing. Filed Dec. 15, 1967, Ser. No. 690,745
Int. Cl. C23f 11/00
U.S. Cl. 148—6.11                                   11 Claims

ABSTRACT OF THE DISCLOSURE

Metal work stock having a bright and clean finish is protected from atmospheric corrosion or discoloration by coating the surfaces it is desired to protect with the normally solid polymeric reaction product of a cyclic imine with a non-metal sulfide, the polymeric material being applied in molten form to the work stock while the metal thereof is at a temperature of about 250 to 300° C. The cyclic imine, selected from ethyleneimine, and alkyl and phenyl mono-substituted ethyleneimines, is reacted at a molar ratio of from about 1:1 to 4:1 with a non-metal sulfide selected from carbon disulfide, carbonyl sulfide, thiophosgene and sulfur chloride. The polymeric product formed at molar ratios quite close to 1:1, or less and applied to a metal surface, are not readily removable by the action of aqueous acid or other solvents. The product formed at molar ratios above about 1.1:1 and applied to a metal surface has some solubility in concentrated aqueous acid and is removable when desired. The solubility in dilute acid increases as the molar ratio is brought to 4:1, at which ratio the product is subject to attack by water and other solvents, and its value as a protective coating is generally diminished for most purposes.

BACKGROUND OF THE INVENTION

Field of the invention

The invention relates to a method of protecting metal work stock prior to fabrication into finished articles and to the coated metal work stock produced by such method, especially that protected by a removable coating.

Most metals used on a commercial scale can be produced as work stock with a bright clean finish. But on storing the work stock until such time as it is desired to fabricate finished goods, the metal is often subjected to corrosion or discoloration on account of contact with the ambient atmosphere.

Description of the prior art

Various ways have been tried to protect the surface of metal work stock during storage periods, sometimes a protective surface finish is applied during fabrication. In the case of steel, it is common practice to cool the steel in an oxygen containing atmosphere. The hot steel forms a coating of mill-scale which serves as a mildly protective coating during storage. Due to the porosity of the oxide coat, however, oxidation does not entirely stop so that the underlying steel is found to be pitted on removal of the mill-scale, e.g., with large (at least stoichiometric) amounts of acid or chelating agent. Alternative methods of protection used heretofore are painting, or, coating with oil. But paint will not adhere, generally, unless the metal surface is clean when the paint is applied. In the case of oil, mill-scale formed prior to oiling generally must still be removed to prepare a fine finished surface. Also, removal of the oil is difficult because solvents must be employed and at least several rinses in or with solvent are needed to insure a low residue of oil on the metal surface.

The preparation of some polymeric materials from a cyclic imine and a non-metal sulfide are described in U.S. Patent No. 2,208,095.

OBJECTS OF THE INVENTION

It is a principal object of the present invention to provide a method of coating clean metal work stock with a protective coating which wards off atmospheric corrosion or discoloration.

It is a further object of the present invention to provide a corrosion resistance to a metal of a nature that it is easily and relatively inexpensively removed from the metal surface when desired, e.g., when it is desired to fabricate the metal.

Another object is to provide coated metal work stock that is readily stripped of its coating or is fabricated readily with or without stripping off the coating.

These and other objects and advantages of the present invention will be more clearly understood by those skilled in the art upon becoming familiar with the following description and the illustrative examples.

SUMMARY OF THE INVENTION

It has now been discovered that various commercial metals or alloys in the form of work stock having a bright and clean finish are protected from atmospheric corrosion or discoloration by coating the surfaces it is desired to protect with a coating consisting of the polymeric reaction product of (1) a cyclic imine selected from the group consisting of ethyleneimine and alkyl and phenyl mono-substituted ethyleneimines with (2) a non-metal sulfide selected from the group consisting of carbondisulfide, carbonyl sulfide, thiophosgene and sulfur chloride, the polymeric material being applied in molten form to the metal while the metal is at a temperature in the range of about 250° to 350° C. The molar ratio of cyclic imine to non-metal sulfide used to make the polymeric material is in the range of about 1:1 to 4:1. The coating may consist of a mixture of the polymeric reaction products having different starting materials and/or molar ratios of reactants.

The coating made up from polymer formed using a molar ratio of cyclic imine to sulfide greater than about 1.1:1 is soluble in aqueous acid solution, the solubility increasing as the molar ratio is increased. This coating is simply and inexpensively stripped with an aqueous acid liquid, although it is resistant to the action of most common commercial organic solvents, $CS_2$, and aqueous caustic. The coating made up from polymer product using a molar ratio of cyclic imine to non-metal sulfide less than about 1.1:1 is highly protective and cannot be stripped from the metal by ordinary solvent action.

BRIEF DESCRIPTION OF THE INVENTION

The polymeric imine-sulfide compounds used for coating metal surfaces according to the invention are prepared by reacting a non-metal sulfide, such as, carbondisulfide, carbonyl sulfide, thiophosgene or sulfur chloride, with cyclic imine. Suitable cyclic imines include thyleneimine and the alkyl and phenyl mono-substituted imines. Examples of such substituted imines are N-methyl, ethyleneimine, C-methyl, ethyleneimine, N-ethyl, ethyleneimine, and N-isopropyl, ethyleneimine, N-phenyl, ethyleneimine and C-phenyl, ethyleneimine.

The cyclic imine or imines selected may be used in either monomeric or polymeric form to prepare the polymerized coating compounds used in the invention.

Generally, it is simplest to make the polymeric coating material by the direct addition of the sulfide to the cyclic imine in the absence of a reaction medium in a reflection flask provided with cooling means. The addition of sulfide is stopped when the requisite proportion to obtain the desired product has been added. Generally the anhydrous reaction product need not be purified before use according to the present method.

If desired, the reaction may also be carried out by placing the imine in aqueous solution and adding the sulfide thereto. The reaction-mixture is usually refluxed until solid yellow reaction product forms and separates. The solid product is recovered by filtration or centrifugation. The recovered material is then air dried before melting it and applying it according to the invention.

Description of the reaction conditions used to react some ethyleneimines with non-metal sulfides to form some of the same and similar resinous products is found in said U.S. Patent No. 2,208,095.

The reaction product of the sulfide and the imine obtained on using from 2 to about 4 moles of imine per mole of sulfide is readily soluble in dilute aqueous acidic solutions. The use of molar proportions of imine greater than about 4 moles per mole of sulfide results in a product which is soluble in water and other solvents and therefore, affords very little protection of metals coated therewith.

As the molar proportions of cyclic imine employed are decreased from 2 moles to about 1.1 mole per mole of sulfide, the solubility of the polymeric reaction product in aqueous acidic solution gradually decreases to the extent that the product is substantially insoluble in dilute acid and is soluble only in concentrated aqueous acid. On using only 1.1 mole or less of imine per mole of sulfide, the polymeric reaction product is highly insoluble in aqueous liquids and other solvents. A higher proportion of sulfide may be used if desired, but it does not materially change the solvent insolubility. Moreover, it is preferred to supply a coating which is removable from the metal and coatings formed with low proportions of imine are not readily removable by solvent action.

Regardless of the molar ratio of the reactants used to form the reaction product used according to the invention, the reaction product is substantially insoluble in such common solvents as methanol, ethanol, perchloroethylene, hexane, acetone, benzene, carbon disulfide or concentrated aqueous caustic solution.

The polymeric reaction product may be applied to most any metal which may be heated readily to the melting temperature of the polymeric material substantially without rapid oxidation of the metal. The polymeric material reacts with and bonds very tightly to cast iron, mild steel and copper. Good adherence of the coating material is obtained on aluminum, zinc and nickel. The adherence to stainless steel is satisfactory but not as good as to the other metals listed.

The polymeric reaction product in air-dried form and of pre-selected composition is melted and applied in any of convenient manner, e.g., by roller coating or by spraying the molten material onto a heated metal article. Generally, the coating is applied while the metal is at a temperature in the range of 250° to 350° C. Preferably a temperature of about 280° to 325° C. is used to permit some flow before the coating sets up and becomes hard. The polymer will cure in about 1 to 5 minutes depending upon the temperature of the metal. An extended period of heating, e.g., 30 minutes or more, will cause some decomposition of the polymer, and is not to be desired.

The metal surface to be protected should be substantially free of grease, oil, carbon deposits or other foreign materials. Normally the metal is free of substantial oxide coating, except in the case of aluminum where the oxide forms very quickly and is not considered to be objectionable. In most other cases the presence of a little oxide is unavoidable, as a practical matter.

The protective coating, if it is to be removed, is removed most readily by spraying with, or dipping the metal article into, an aqueous acidic solution containing sulfuric acid or hydrochloric acid, usually at a concentration of about 3 to 10 percent by weight. Any other strong, proton-donating acid, such as sulfamic acid, may be used if desired provided that it does not cause undesirable corrosive attack upon the metal surface during dissolution of the protective coating.

For the purposes of the discussion herein, a dilute aqueous acid contains up to about 10 percent by weight of the acid, or proton-donating compound, but not more than about enough to provide a hydrogen ion concentration of about 6 normal. A concentrated aqueous acid solution is stronger than 6 normal in hydorgen ion and generally contains more than about 10 percent by weight of the acidic compound.

Normally the metal is rinsed with water after the acid strip and dried or allowed to dry before commencing fabrication operation.

The following examples are illustrative and do not limit the scope of the invention.

Example 1.—Into a 2 liter aqueous solution which contained about 300 grams of ethyleneimine was added dropwise about 300 grams of carbon bisulfide. The carbon bisulfide addition was done with stirring and with cooling in order to control the heat given off by the reaction and prevent the carbon bisulfide from volatilizing out of the liquid. After all the corbon bisulfide was added and the heat had been given off, the mixture was heated to about 45° C. to insure more complete conversion. The percipitate which was formed was filtered out and washed with distilled water and 5 percent HCl solution. The powdery product was a pale yellow color.

A portion of the product was melted at about 150° C. and rolled onto a steel coupon which was headed to 280° C. prior to having the coating applied. The coated coupon was maintained at 280° C. for about one minute and then allowed to cool. The coating became a lustrous black because of the reaction with the steel and had excellent adhesion. The coating was insoluble in water, alcohol, perchlorinated hydrocarbons, hexane, acetone, carbon bisulfide, benzene and concentrated NaOH. It was soluble in HCl and could be removed from the steel coupon by treating it with HCl.

A steel coupon having the dimensions 3 inches by 1 inch by 1/16 inch was coated on one side by the above-described method. The coated coupon was placed in a 5 percent sodium chloride solution which had air rapidly bubbling through it, the immersion being maintained for three and-a-half days at 25° C. At the end of that time the coupon was inspected and there was no evidence of corrosion on the coated side of the coupon and the coating was still intact and undamaged. The coating was removed by an acid washing and the substrate was found to be free of pitting or other signs of corrosion. The uncoated side was severely corroded and pitted.

Example 2.—A portion of polymer as used in Example 1 was used to coat a copper coupon in similar manner to which the steel coupon in Example 1 was coated. The coating became a lustrous black during the heating period of the coating process which indicated the polymer reacted with the copper substrate.

The coated coupon was immersed in a 5 percent sodium chloride bath, with air bubbling rapidly through it, for three and-a-half days at 25° C. Visual inspection indicated that the coated side of the coupons had been protected against corrosion by the coating and when the coating had been removed by acid washing, there was no pitting or other evidence of corrosion on the side which had been coated. The uncoated side had been noticeably corroded.

Example 3.—Coupons of aluminum zinc, and nickel were coated as in Example 1. The polymer did not appear to react with these substrates and did not become black, but did darken somewhat and became amber and opaque. Adhesion was good and the coatings protected the substrates from corrosion when subjected to the salt bath as in Example 1.

*Example 4.*—A corrosion test was made to compare variously treated steel coupons having the dimensions 3 inches by 1 inch by 1/16 inch. The coupons were immersed in a 5 percent sodium chloride solution, through which air was rapidly bubbled, for three and-a-half days at 25° C. The corrosion rate was calculated from weight loss measurements in order of loss measurements and extrapolated to a one-year basis. The duplicate coupons were used in each case. The various treatments and the extrapolated corrosion rates are summarized in the following table.

TABLE I

| Run | Description | Corrosion Rate [1] |
|---|---|---|
| 1 | Uncoated coupon used as a "control" | .4190 |
| 2 | Coated with zinc-rich primer (commercial primer)[2] | .2499 |
| 3 | Coated with a commercial metal enamel [2] | .3259 |
| 4 | Coated according to this invention | .2042 |

[1] Corrosion values given in pounds per square foot per year.
[2] The commercial primer and commercial metal enamel used above were applied by spraying them from aerosol spray cans. All coatings were applied to a thickness between .007 millimeter to .015 millimeter.

*Example 5.*—A reaction of ethyleneimine and carbon bisulfide was performed as in Example 1 except that equimolar quantities of the ethyleneimine and carbon bisulfide were used. The product had about the same physical appearance as that of Example 1. The product was insoluble in all the solvents that the product of example was insoluble in and in addition was insoluble in concentrated HCl. The product of this run was also found to react with iron and copper during the heating step of the coating process and became a lustrous black, adherent coating in each case.

To evaluate the coating as a corrosion inhibitor in acid, a 3.8 percent uninhibited aqueous HCl solution was prepared and four duplicate steel coupons of each type being tested were immersed separately in 400 milliliters of the acid. The specimens were immersed for 18 hours at 25° C. and the amount of dissolved iron in the acid was measured. The amounts shown in the chart were the average of the four duplicates of each test specimen.

| Run | Description | Percent iron in the acid solution |
|---|---|---|
| 5 | Uncoated coupon used as a "control." | .0166 |
| 6 | Coated on one side with primer | .0117 |
| 7 | Coated on one side with ethyleneimine/carbon bisulfide polymer. | .0092 |

In runs 6 and 7 above, the coated area comprised about 46 percent of the surface area of the coupon (the edges and one side were not coated). From this it was calculated that the corrosion rates in pounds per square foot per year were as shown below:

Run: Corrosion rate
5 ———————————————————— .4241
6 ———————————————————— .1798
7 ———————————————————— <.0002

*Example 6.*—The same polymeric product as used in Example 5 was applied to copper, aluminum, zinc, and nickel coupons and adherent coatings were obtained which were found to protect the metal surfaces from corrosion.

The method and article of the invention having been thus fully described, various modifications thereof will at once be apparent to those skilled in the art.

I claim:
1. The method of providing a corrosion resistance to a metal selected from the group consisting of cast iron, mild steel, copper, aluminum, zinc and nickel, which comprises:

providing the solid polymeric product of the reaction of a cyclic imine, selected from the group consisting of ethyleneimine and the alkyl and phenyl monosubstituted ethyleneimines, with a non-metal sulfide selected from the group consisting of carbon disulfide, carbonyl sulfide, thiophosgene and sulfur chloride, the proportions of reactants being about 1 to 4 moles of cyclic imine per mole of non-metal sulfide;

melting said solid polymeric reaction product;

applying said molten polymeric reaction product as a coating to said metal while said metal is at a temperature in the range of 250° to 350° C.;

and solidifying said coating on said metal.

2. The method as in claim 1 in which the metal is maintained at a temperature in the range of 280° to 325° C.

3. The method as in claim 1 in which the metal is mild steel.

4. The method as in claim 1 in which the metal is copper.

5. The method as in claim 1 in which the molten polymeric reaction product is applied by roller coating.

6. The method as in claim 1 in which the molten polymeric reaction product is applied by spraying.

7. The method as in claim 1 in which the polymeric material is a reaction product of substantially more than 1.1 but not more than 4 moles of cyclic imine per mole of non-metal sulfide.

8. The method as in claim 7 in which the coating is removable with aqueous acid solution.

9. The method as in claim 1 in which the polymeric material consists of the reaction product of about 1 mole of cyclic imine per mole of non-metal sulfide.

10. The method as in cliam 1 in which the provision of corrosion resistance is controllably temporary, the polymeric material is a reaction product of from about 2 to about 4 moles of cyclic imine per mole of non-metal sulfide.

11. A metal article coated and protected according to the method of claim 1.

References Cited

UNITED STATES PATENTS 2,208,095 7/1940 Esselman et al. —————— 260—79
2,479,762 8/1949 Morris ————————— 117—6
2,673,161 3/1954 Dieman ————— 252—395 X
3,268,463 8/1966 McAninch et al. ——— 117—132 X WILLIAM D. MARTIN, Primary Examiner
HARRY J. GWINNELL, Assistant Examiner U.S. Cl. X.R.

117—6, 49, 132; 148—6.24